United States Patent [19]

Adler et al.

[11] 4,337,323
[45] Jun. 29, 1982

[54] STABILIZED AQUEOUS DISPERSIONS OF VINYL CHLORIDE POLYMERS

[75] Inventors: Klaus Adler; Klaus Häfener; Herbert Eck, all of Burghausen, Fed. Rep. of Germany

[73] Assignee: Wacker-Chemie GmbH, Munich, Fed. Rep. of Germany

[21] Appl. No.: 204,428

[22] Filed: Nov. 6, 1980

Related U.S. Application Data

[63] Continuation of Ser. No. 15,564, Feb. 26, 1979, abandoned.

[30] Foreign Application Priority Data

Mar. 3, 1978 [DE] Fed. Rep. of Germany ....... 2809260

[51] Int. Cl.$^3$ ............................................. C08K 5/16
[52] U.S. Cl. ................................... 524/239; 524/567
[58] Field of Search ............. 260/29.6 MN, 45.85 N, 260/29.6 PT, 29.6 R; 526/344.2

[56] References Cited

U.S. PATENT DOCUMENTS

| | | | |
|---|---|---|---|
| 2,558,728 | 7/1951 | Britton et al. | 260/45.85 |
| 3,125,557 | 3/1964 | Harris | 526/344.2 |
| 3,134,743 | 5/1964 | Haberman | 260/45.85 |
| 4,252,705 | 2/1981 | Brecker | 260/29.6 MN |
| 4,292,424 | 9/1981 | Huddleston et al. | 260/29.6 PT |

*Primary Examiner*—V. P. Hoke
*Attorney, Agent, or Firm*—Allison C. Collard; Thomas M. Galgano

[57] ABSTRACT

Stabilized aqueous dispersions of vinyl chloride polymer having at least 25% by weight of vinyl chloride units in the polymer and having K values of between 20 and 80, having added as a stabilizing agent 0.3–6% by weight of substances selected from the group of compounds according to the general formula

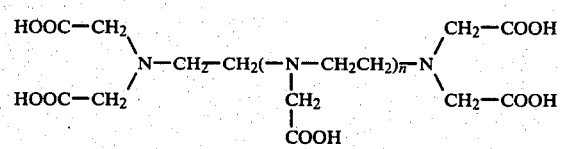

wherein n has the meaning of from 0 to 2 or water-soluble salts thereof. The invention also relates to a process of producing the stabilized products by adding the stabilizing agent after polymerization in aqueous dispersion, and to the use of the stabilized dispersions in binders, coating compositions, paints, adhesives, textile auxiliaries and paper-coating compositions.

3 Claims, No Drawings

STABILIZED AQUEOUS DISPERSIONS OF VINYL CHLORIDE POLYMERS

This application is a continuation, of application Ser. No. 015,564, filed Feb. 26, 1979, now abandoned.

The present invention relates to stabilized vinyl chloride homopolymers or copolymer mixtures and a process for producing the same.

It is customary to protect polyvinyl chloride polymers from the disadvantageous effects of heat and light by the addition of stabilizers. The heavy metal salts of carboxylic acids rich in carbon are commonly used for this purpose, the action of which may be assisted, if required, by means of additional costabilizers such as, for example, epoxidized vegetable oils, esters of phosphorous acid, acetoacetamides, polyvalent alcohols or ethylenediaminetetraacetic acid and the salts thereof.

From German OS No. 15 44 639 (Offenlegungschrift,) it is already known to introduce an ethylenediaminetetraacetate as costabilizer into compositions containing polyvinyl chloride. There the prerequisite of stabilization is the presence of a primary stabilizer containing a heavy metal.

Attempts to use costabilizers alone as stabilizers do not produce an improvement in the stability of polyvinyl chloride polymers. For many purposes, the heavy metal content of such primary stabilizers is physiologically not without risk. Frequently, incorporation into aqueous dispersions is impeded and, moreover, the often hydrophobic stabilizers can exude from polymer compositions.

It is further known to add ethylenediaminetetraacetic acid or salts thereof, in quantities of less than 0.005% by weight calculated on the resin, to the polymer dispersions after polymerization, which dispersions, by reason of their preparation, contain traces of heavy metal, such as, for example, iron or copper.

It is thus the object of the instant invention to find primary stabilizers for aqueous vinyl chloride homopolymer and copolymer dispersions and the processing products thereof, which will provide excellent stabilization even without the use of primary stabilizers containing heavy metal.

The present invention consists of stabilized vinyl chloride homopolymer or copolymer mixtures having at least 25% by weight of vinyl chloride units in the polymer, and having K values of between 20 and 80, characterized in that the polymers are present in admixture with 0.3 to 6% by weight of substances selected from the group of compounds according to the general formula

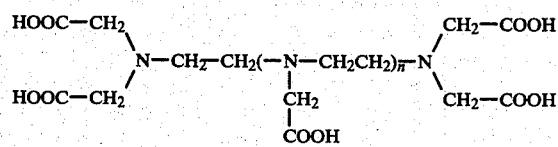

wherein n has the meaning of from 0 to 2 or the water-soluble salts thereof.

A further subject of the present invention is stabilized vinyl chloride homopolymer or copolymer mixtures according to claim 1, characterized in that the polymers are present in an aqueous dispersion having particle sizes of between 0.001 and 15 μm, in the presence of the customary quantities of protective colloid and/or emulsifiers, and having solids contents of between 10 and 60% by weight, calculated on the total dispersion. The solids consisting of the water-soluble salts of substances selected from the group of compounds according to the general formula

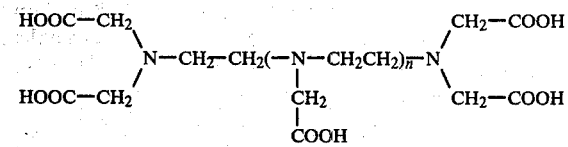

wherein n has the meaning of from 0 to 2 alkali metal salts, ammonium salts or alkaline earth metal salts.

The present invention further consists of a process for the stabilization of aqueous vinyl chloride homopolymer or copolymer dispersions having at least 25% by weight of vinyl chloride units in the polymer, which is characterized in that substances selected from the group of compounds according to the general formula

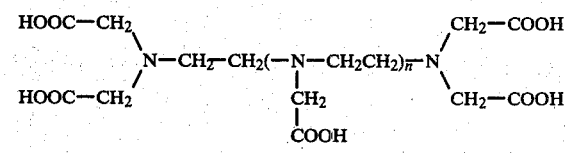

wherein n has the meaning of from 0 to 2 or the water-soluble salts thereof, is or are added, after polymerization and before working up or further processing, in quantities of from 0.3 to 6% by weight, calculated on the proportion of polymer in the dispersion.

Furthermore, the invention also relates to the use of stabilized dispersions described above in binders, in coating compositions, paints, adhesives, textile auxiliaries and paper-coating compositions.

Surprisingly, it has been discovered that the addition of 0.3 to 6% by weight of substances selected from the group of compounds according to the general formula

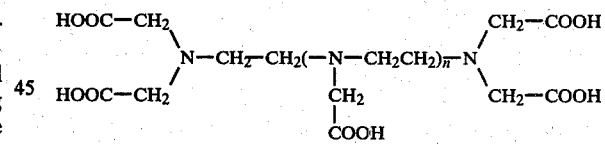

wherein n has the meaning of from 0 to 2 or the water-soluble salts thereof alone, provides good stabilization of aqueous vinyl chloride homopolymer or copolymer dispersions against heat and light, without the use of additional stabilizers. The dispersions stabilized, according to the process of the present invention and the processing products thereof, display better stability than the polyvinyl chloride polymer compositions that are produced according to German Offenlegungschrift OS No. 15 44 639, with a combination of carboxylic acid salts containing a heavy metal as the primary stabilizer and an ethylenediaminetetraacetate as a costabilizer.

The aqueous vinyl chloride homopolymer and copolymer dispersions stabilized according to the present invention, which contain at least 25% by weight of vinyl chloride units in the polymer, may contain the following copolymerizable monomers: olefins, such as, for example, ethylene, propylene, octene, and dodecene; vinyl esters of straight or branched aliphatic carboxylic acids having 1 to 18 carbon atoms, such as, for example, vinyl acetate, vinyl propionate, vinyl butyrate, Versatic acid vinyl ester, vinyl laurate, and vinyl stearate; with unsaturated carboxylic acids, carboxylic acid amides, and carboxylic acid esters with aliphatic straight or branched alcohols having 1 to 18 carbon atoms. Suitable carboxylic acids are, for example, acrylic acid, methacrylic acid, itaconic acid, maleic acid and fumaric acid. Also suitable are other copolymerizable compounds such as, for example, vinylidene chloride, vinylidene fluoride, and those having reactive groups, such as hydroxyethyl, hydroxypropyl, and hydroxyhexyl acrylates or methacrylates, semiesters of monoamides of maleic acid or fumaric acid, polymerizable semiesters (vinyl or allyl) of aliphatic dicarboxylic acids, for example, succinic acid, adipic acid, vinylsilanes or acrylsilanes, allyl esters of acetoacetic acid or diacetylacetic acid, and allylamidodichlorotriacine. The polymers have K values of between 20 and 80.

The dispersions are prepared according to the customarily known methods of dispersion polymerization, emulsion polymerization, or micropearl polymerization or, alternatively, by graft polymerization. The polymerization process is not critical for the stabilization of dispersions according to the present invention, as regards the polymerization initiators and the polymerization auxiliaries used, as long as the condition is met that the particle size of the polymers in the dispersion remains below approximately 15 μm. It has been observed that the stabilization effect of the dispersion is positively influenced as the particle size decreases and as porosity increases. The polymer particle sizes are frequently below 10 μm, a particle size of below 5 μm being especially suitable. In general, the particle sizes of the dispersions are greater than 0.001 μm. With regard to polymers that are water-soluble or are rendered water-soluble by reaction with compounds having an alkaline reaction, it is not customary to speak of "particle sizes" of the polymers. These polymers can be stabilized according to the present invention, at least as well as polymer dispersions having distinct particles.

In general, dispersions have solids contents of between 10 and 60% by weight. The dispersions can be used as such or in admixture with fillers, dyes, thickeners or hardeners and others auxiliaries. Coating material, dispersion-based paints, adhesives, binders for textile auxiliaries and binders for paper-coating compositions, prepared from the dispersions in this way are all distinguished by their marked stability against heat and light.

The dispersions listed in Table 1 are tested in the Examples. The percentage quantities of substances selected from the group of compounds according to the general formula

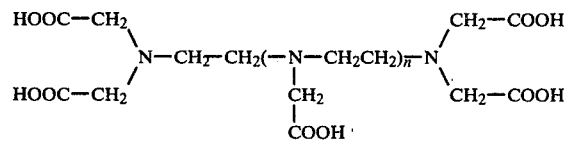

wherein n has the meaning of from 0 to 2 given in the other Tables are in each case calculated on the solid polymer content of the dispersion.

Table 2 shows the heat stabilizing action of substances selected from the group of compounds according to the general formula

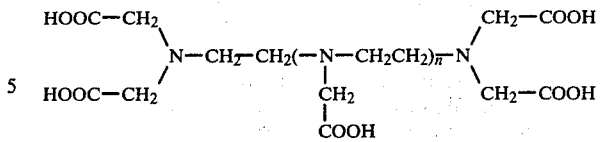

wherein n has the meaning of from 0 to 2 or the sodium salts thereof in the various dispersions and also dependence on the added amount of substances selected from the group of compounds according to the general formula

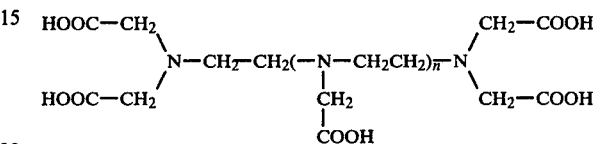

wherein n has the meaning of from 0 to 2 or the sodium salts thereof.

The excellent stabilizing action can be clearly seen. Results are rated according to the following scale:

| | |
|---|---|
| colorless | 1 |
| light yellow | 2 |
| yellow | 3 |
| light brown | 4 |
| brown | 5 |
| dark brown | 6 |
| brownish black | 7 | in which colorless is the best rating. A minus sign after the number indicates that the rating lies between this number and the next higher number. A distinct stabilizing action of the ethylenediaminetetraacetic acid or the sodium salt thereof can be identified in all of the dispersion films tested.

In Table 4, the claimed compounds are compared with a series of known polyvinyl chloride stabilizers. None of these achieved the excellent action of the salts of substances selected from the group of compounds according to the general formula

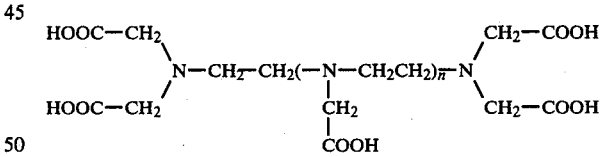

wherein n has the meaning of from 0 to 2. All of the stabilizers tested display, at best, a much more inferior action. Many cannot be incorporated into the aqueous dispersions or discolor these even when cold.

It can be clearly seen from Table 5 that, contrary to the assertions of the meanwhile withdrawn German Offenlegungschrift OS No. 15 44 693, ethylenediaminetetraacetic acid and the salts thereof, are not suitable as costabilizers.

Finally, Table 6 shows that it is unimportant whether ethylenediaminetetraacetic acid or the sodium or zinc salts thereof are used. The pH value of the dispersion also plays no significant role. In contrast, zinc sulphate alone is not effective.

The unpigmented film of Dispersion 1 on aluminum foils was subjected to weathering in the open air. After 120 days, the stabilized test specimen (1% of the sodium salt of ethylenediaminetetraacetic acid) is slightly discolored, while the unstabilized specimen is dark brown.

It will be obvious to those skilled in the art that other changes and variations can be made in carrying out the present invention, without departing from the spirit and scope thereof, as defined in the appended claims.

TABLE 3

UV-STABILIZING ACTION OF Na SALT OF EDTA.
EXPOSURE TIME: 160 HOURS

| Dispersion No. | without EDTA | 1% EDTA | 2% EDTA |
|---|---|---|---|
| 1 | 4 | 2— | * |
| 2 | 3 | 2 | 2 |
| 3 | 3 | 2 | * |

*no measurement

TABLE 1

POLYMER COMPOSITION OF THE DISPERSIONS USED

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| vinyl chloride | 65 | 65 | 60 | 60 | 25 | 63 | 70 | 25 | 100 | 47 | 60 | 60 | 40 | 50 |
| vinyl acetate | 15 | 15 | 20 | 40 | 60 | 17 | 24 | 60 | — | — | 15 | 15 | 20 | 50 |
| ethylene | 20 | 20 | 20 | — | 15 | 17.5 | 6 | 15 | — | — | 15 | 19 | — | — |
| butyl acrylate | — | — | — | — | — | — | — | — | — | 25 | — | — | — | — |
| hydroxypropyl acrylate | — | — | — | — | — | — | — | — | — | — | 10 | — | — | — |
| 2-ethylhexyl acrylate | — | — | — | — | — | — | — | — | — | 25 | — | — | — | — |
| vinyltriethoxysilane | — | — | — | — | — | — | — | — | — | — | — | 3 | — | — |
| glycidyl methacrylate | — | — | — | — | — | — | — | — | — | — | — | — | 10 | — |
| 1-allylamino-3,5-di-chlorotriamine | — | — | — | — | — | — | — | — | — | — | — | 3 | — | — |
| vinyl laurate | — | — | — | — | — | — | — | — | — | — | — | — | — | — |
| allyl acetoacetate | — | — | — | — | — | — | — | — | — | — | — | — | — | — |
| Veova(+) | — | — | — | — | — | — | — | — | 3 | — | — | — | 30 | — |
| N-methylolacrylamide | — | — | — | — | — | 2.5 | — | — | — | — | — | — | — | — |
| maleic acid anhydride | — | — | — | 0.2 | — | — | — | — | — | — | — | — | — | 0.2 |
| acrylamide | 1 | — | — | — | 1 | — | 1 | — | — | 1 | 1 | 1 | 2 | — |
| acrylic acid | 1 | — | — | — | — | — | 1 | — | — | 2 | 1 | 1 | 1 | — |
| non-ionic emulsifier(*) | 5.5 | 2.5 | 1 | 3.1 | 4.0 | — | 4.5 | 2 | 2 | 3.5 | 4.3 | 5.5 | 5 | 3.0 |
| polyvinyl alcohol(**) | — | — | 5.5 | — | — | 5.5 | — | 4.5 | — | — | — | — | — | — |
| vinyl sulphonate | 0.8 | 0.1 | — | 0.15 | 0.8 | — | 0.8 | — | — | 0.5 | 0.8 | 0.6 | 0.8 | 0.2 |
| anionic emulsifier(***) | 0.3 | 0.15 | — | 1.2 | 0.3 | — | 0.3 | — | 0.4 | 0.3 | 0.3 | 0.25 | 0.2 | 1.2 |
| hydroxyethylcellulose | — | — | — | — | — | — | — | — | — | — | — | — | — | — |

(*)Long-chain aliphatic alcohol polyglycol ether
(**)Saponification number 140 - Viscosity according to Hoppler (20° C.) 5
(***)Sodium alkylsulphonate
(+)Trademark

TABLE 2

HEAT STABILIZING ACTION OF ETHYLENEDIAMINETETRAACETIC ACID IN DISPERSION FILMS.
STORAGE FOR 20 HOURS AT 140° C.

| Dispersion No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| without EDTA | 4— | 3— | 6 | 6 | 5 | 5 | 6 | 6 | 5* | 6 | 5— | 4 | 5 | 7— |
| 0.2% EDTA | 4 | 3 | 5 | 4— | 4 | 5 | 5 | 3 | 4* | 4 | 5 | 4 | 3 | 7 |
| 0.5% EDTA | 3 | 3 | 4 | 2 | 3 | 3 | 4 | 2— | 3* | 3 | 3 | 3 | 3 | 6 |
| 1% EDTA | 2 | 2 | 2 | 2 | 2 | 2 | 3— | 3 | 2* | 2 | 2 | 2 | 2 | 4 |
| 2% EDTA | 1— | 1 | 1— | — | — | — | 2 | — | — | — | — | — | — | 2 |
| 0.2% Na-DETPA** | — | 3 | — | — | — | — | — | — | — | — | — | — | — | — |
| 0.4% Na-DETPA** | — | 2— | — | — | 3 | — | — | — | — | — | — | — | — | — |
| 0.4% Na-TETHA*** | — | 3 | 2— | — | 3 | 2— | — | — | 3— | — | — | — | — | — |

*violet tinged
**Sodium salt of Diethylenetriaminpentaacitic acid
***Triethylenetetraminhexaacetic acid

TABLE 4

COMPARISON TESTS COMPARING VARIOUS COMMERCIALLY USED PVC STABILIZERS
WITH THE Na SALT OF EDTA. STORAGE FOR 20 HOURS AT 130° C.

| Type of stablizer | in Dispersion 1 | | in Dispersion 2 | | in Dispersion 3 | | in Dispersion 4 |
|---|---|---|---|---|---|---|---|
| | Quantity of Stab. (%) | Rating | Quantity of Stab. (%) | Rating | Quantity of Stab. (%) | Rating | Quantity of stab. (%) |
| — | — | 1 | — | 3— | — | 3— | |
| Na salt of EDTA | 1 | 1— | 2 (or 1) | 1— | 1 | 1— | |
| Sn 41 S (Hoechst) | 2 | 1— | 2 | 2 | 2 | 2 | |
| Irgastab CZ 57 | 1.5 | 3— | 2 | 2 | 2 | 2 | |
| Irgastab CZ 57/Tinuvin 320 | 2/2 | 2— | | | | | |
| Irgastab CZ 57/Reoplast 39 | 1.5/1.5 | 3 | | | | | |
| Reoplast 39 | 2 | 4 | 2 | 2— | 2 | 2— | |
| Reoplast 39/BC 206 | 2/1.5 | 3 | | | | | |
| Reoplast 39/Tinuvin 320 | 2/2 | 3— | | | | | |
| Irgastab A 70 | 2 | 3 | 2 | 3 | 2 | 4[1] | |
| Irgastab A 70/Tinuvin 320 | 2/2 | 3— | | | | | |
| Irgstab A 70/Irgastab CZ 57 | 2/2 | 2 | | | | | |
| Tinuvin 320 | 2 | 2— | | | | | |

TABLE 4-continued

COMPARISON TESTS COMPARING VARIOUS COMMERCIALLY USED PVC STABILIZERS WITH THE Na SALT OF EDTA. STORAGE FOR 20 HOURS AT 130° C.

| Type of stabilizer | in Dispersion 1 Quantity of Stab. (%) | Rating | in Dispersion 2 Quantity of Stab. (%) | Rating | in Dispersion 3 Quantity of Stab. (%) | Rating | in Dispersion 4 Quantity of stab. (%) |
|---|---|---|---|---|---|---|---|
| Tinuvin 320/VC 206 | 2/2 | 4 | | | | | |
| Irgastab 17 N | 2 | 2 | | | | | |
| Irgastab D 671 | 2 | 2— | | | | | |
| Na—DETPA | — | — | 1 | 1— | — | — | 1 |
| Na—TETHA | 1 | 1— | 1 | 1— | 2 | 1— | — |

Explanation of brand names
Irgastab CZ 57:paste-like Ca/Zn stabilizer with 70% epoxidized oils.
CZ 11: somewhat higher stability than CZ 57.
BC 206: liquid Ba/Cd/Zn stabilizer with synergistically acting additives.
Tinuvin 320: benzotriazole type.
Reoplast 39: epoxy soybeanoil
Veova: vinyl ester of α,α-dimethyl-caprylic acid
THE FOLLOWING STABILIZERS EXUDE SO MUCH, OR COULD ONLY BE INCORPORATED SO INSUFFICIENTLY, THAT A RATING WOULD BE MEANINGLESS: IRGASTAB CZ 113; IRGASTAB CH 55; IRGASTAB CZ 11; IRGASTAB BC 206 (ALONE).
THE FOLLOWING STABILIZERS DISCOLORED THE DISPERSIONS SO STRONGLY, EVEN WHILE BEING MIXED IN, THAT THEY CANNOT BE USED IN PRACTICE: PLASTONOX 2246 (BROWN); DECAMETHYLENEGLYCOL BIS -β-AMINOCROTONATE (YELLOW); HEXANE-1,6-DIOL BIS-β-AMINOCROTONATE (YELLOW) AND GLYCERINE TRIS-AMINOCROTONATE (YELLOW).

TABLE 5

COMPARISON TESTS WITH Na SALT OF EDTA AS COSTABILIZER IN DISPERSIONS 1 AND 4. STORAGE FOR 20 HOURS AT 140° C.

| Type of stabilizer | Quantity of stabilizer | Rating |
|---|---|---|
| (1) | — | 3— |
| (2) | — | 5 |
| EDTA-Na$^{(1)}$ | 0.3 | 2 |
| EDTA-Na$^{(2)}$ | 0.5 | 1— |
| EDTA-Na$^{(2)}$ | 0.5 | 3 |
| Tinuvin 220 | 2 | |
| EDTA-Na$^{(2)}$ | 0.5 | 3 |
| Irgastab CZ 57 | 2 | |
| EDTA$^{(1)}$-Na | 0.3 | 3— |
| Sn 41 S | 0.3 | |

$^{(1)}$Dispersion 1
$^{(2)}$Dispersion 2

TABLE 6

COMPARISON OF EDTA AND THE SODIUM AND ZINC SALTS THEREOF, AT VARIOUS pH VALUES. DISPERSION 4 WAS TESTED. STORAGE FOR 20 HOURS AT 140° C.

| | without stabilization | EDTA and Na & Zn salts | | | | | | | | | ZnSO$_4$ |
|---|---|---|---|---|---|---|---|---|---|---|---|
| | | 0.2% | 0.5% | 1% | 0.2% | 0.5% | 1% | 0.2% | 0.5% | 1% | 1% |
| pH 3.3 | 5 | 4 | 1— | 2 | — | — | — | — | — | — | — |
| pH 5 | — | — | — | — | 4 | — | — | 4 | — | — | — |
| pH 6 | 6 | — | — | — | 4 | 2— | 2— | — | 2— | — | 7 |
| pH 7 | 7 | — | — | — | — | — | 1— | — | — | 1— | — |

What is claimed is:

1. An aqueous dispersion comprised of a stabilized vinyl chloride homopolymer or copolymer having at least 25% by weight of vinyl chloride units in the polymer and having K values of between 20 and 80 characterized by the presence in said polymer of from 0.3 to 6% by weight of the polymer of one or more of the compounds having the general formula

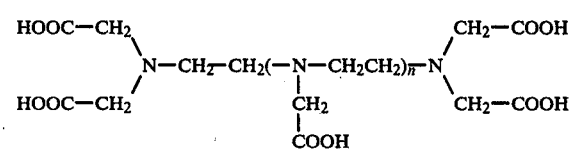

wherein n has the meaning from 0 to 2, or the water-soluble salts thereof, wherein the the polymer has a particle size range of between 0.001 and 15 μm, in the presence of the customary quantities of protective colloid or emulsifiers, and having solids contents of between 10 and 60% by weight, calculated on the total dispersion.

2. An aqueous dispersion comprised of a stabilized vinyl chloride homopolymer or copolymer as recited in claim 1, containing as water-soluble salts of said substances selected from the group of compounds according to said general formula, a member of the group consisting of alkali metal salts, ammonium salts and alkaline earth metal salts.

3. A process for the stabilization of aqueous vinyl chloride homopolymer or copolymer dispersion having at least 25% by weight of vinyl chloride units in the polymer, wherein a single stabilizer comprising substances selected from the group of compounds according to the general formula

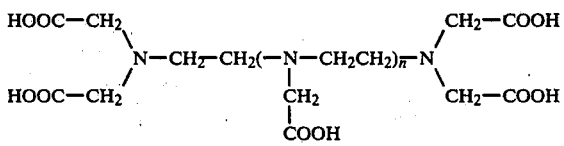

wherein n has the meaning from 0 to 2, or the water-soluble salts thereof are added, after polymerization and before working up and further processing, in quantities of from 0.3 to 6% by weight, calculated on the proportion of polymer in the dispersion.

* * * * *